United States Patent [19]
Jacobsen et al.

[11] Patent Number: 5,198,740
[45] Date of Patent: Mar. 30, 1993

[54] SLIDING CONTACT MECHANICAL/ELECTRICAL DISPLACEMENT TRANSDUCER

[75] Inventors: Stephen C. Jacobsen; Michael G. Mladejovsky; John E. Wood, all of Salt Lake City, Utah

[73] Assignee: University of Utah Research Foundation, Salt Lake City, Utah

[21] Appl. No.: 478,266

[22] Filed: Feb. 12, 1990

Related U.S. Application Data

[63] Continuation-in-part of Ser. No. 417,181, Oct. 4, 1989.

[51] Int. Cl.⁵ .................... G01R 29/12; H04R 19/00
[52] U.S. Cl. ........................ 318/687; 318/135; 200/61.53
[58] Field of Search ............... 318/560–646; 200/2.6 R, 111 C, 292, 61.53, 503, 16 R, 11 R, 153

[56] References Cited

U.S. PATENT DOCUMENTS

| | | | |
|---|---|---|---|
| 3,452,175 | 6/1969 | Wilkes | 200/61.53 |
| 3,452,309 | 6/1969 | Wilkes | 200/61.53 |
| 3,471,668 | 10/1969 | Wilkes | 200/61.53 |
| 3,546,402 | 12/1970 | Speeth | 200/16 |
| 3,567,881 | 3/1971 | Duimstra | 200/61.53 |
| 3,688,063 | 2/1971 | Bell | 200/61.53 |
| 4,100,420 | 7/1978 | Metcalf et al. | 307/311 X |
| 4,157,462 | 6/1979 | Blanchard | 200/61.45 R |
| 4,203,015 | 5/1980 | Tuchscherer | 200/61.45 R |
| 4,220,944 | 9/1980 | Pudelko et al. | 338/176 |
| 4,230,978 | 10/1980 | Gardella, Jr. et al. | 318/687 |
| 4,348,559 | 9/1982 | Chu | 200/11 R |
| 4,380,692 | 4/1983 | Blanchard et al. | 200/61.45 R |
| 4,533,798 | 8/1985 | Yatchum et al. | 200/11 R |
| 4,767,973 | 8/1988 | Jacobsen et al. | 318/652 |
| 4,789,803 | 12/1988 | Jacobsen et al. | 310/809 |

OTHER PUBLICATIONS

"Rolamite A New Mechanical Design Concept" by D. F. Wilkes Dec. 1967.

*Primary Examiner*—Paul Ip
*Attorney, Agent, or Firm*—Thorpe, North & Western

[57] ABSTRACT

Displacement measuring apparatus for measuring the displacement and movement of an object includes an array of sensors having an operative surface and circuitry for producing an electrical output signal whose value is dependent upon the disposition of an electrical/magnetic field producing member along the sensor array. The field producing member is disposed to contact and slide over the operative surface as the object whose displacement is to be measured is moved. The value of the electrical output signal produced by the circuitry is thus dependent upon the position of the field producing member along the sensor array and thus by the position and movement of the object.

13 Claims, 3 Drawing Sheets

SLIDING CONTACT MECHANICAL/ELECTRICAL DISPLACEMENT TRANSDUCER

BACKGROUND OF THE INVENTION

This is a continuation-in-part of application Ser. No. 417,181 filed Oct. 4, 1989.

This invention relates in general to apparatus for sensing displacement or position of an object, and in particular to apparatus in which the displacement of the object is measured electrically as the object is moved relative to another element, with which the object maintains sliding (mechanical) contact.

In the operation of various mechanical and electromechanical systems, it is necessary to monitor the position and displacement of either some element of the system or some object which is not part of the system. For example, in robotic systems it is almost always necessary to monitor and control the movement and position of various component parts of the systems, such as an arm, fingers or other grasping elements, etc. Such monitoring and control yields the dexterity and precision required for a robotic system to carry out its functions.

Prior art mechanisms for sensing position and displacement have most often utilized a direct connection between the article or object whose position or displacement was to be monitored, and some type of gauge, needle or other visual indicator. Movement of the article or object would thus cause a corresponding movement of the gauge or needle. As expected, such mechanisms have typically been large and cumbersome, have lacked precision in carrying out the monitoring function, and have been unreliable.

Although electronic apparatus for measuring position and displacement has come into greater use in recent years and has at least partially solved the bulkiness and imprecision problems of the prior art mechanism, such apparatus has been complicated in design and thus difficult to manufacture and maintain.

SUMMARY OF THE INVENTION

It is an object of the invention to provide a simple, efficient and reliable apparatus for measuring position and movement of a component or article.

It is another object of the invention to provide such apparatus which is compact and contains few moving parts.

It is a further object of the invention to prove such apparatus in which the component whose position is to be measured moves in light, sliding contact relative to another element.

It is also an object of the invention to provide such apparatus which is well-suited for implementation using semiconductors and integrated circuits.

It is still another object of the invention to provide such apparatus which can be fabricated utilizing conventional integrated circuit fabrication technology for at least part of the apparatus.

The above and other objects of the invention are realized in one specific illustrative embodiment of displacement measuring apparatus adapted for measuring position and movement of an object. The displacement measuring apparatus includes a sensor (or plurality of sensors), formed with at least one surface area over which an insulation coating is formed, for producing an electrical output signal whose value varies with variation in the location of a field emitter element on the surface area. A field emitter element is coupled to the object whose position and movement is to be determined, and the object is disposed to move relative to the sensor so that the field emitter element is caused to slide over the surface area in light contact therewith. Movement and position of the object is thus determined by the electrical signal produced by the sensor (or sensors).

In accordance with one aspect of the invention, the field emitter element is comprised of a thin foil tab connected at one end to the object so that the other end lightly touches and slides over the surface area as the object is moved.

In accordance with another aspect of the invention, the field emitter element is comprised of a strip of material disposed on the object to lie generally flat on the surface area and slide thereover as the object is moved.

In accordance with still another aspect of the invention, a voltage is supplied to the field emitter element to cause it to produce an electric field and the sensor is comprised of an array of field-effect transistors for successively detecting the electric field produced by the field emitter element and thus the location of the field emitter element on the surface area relative to the various field-effect transistors. Alternatively, the field emitter element may be magnetized and the sensor may comprise an array of split-drain magnetic field-effect transistors for detecting the magnetic field developed by the field emitter element and thus the position of the field emitter element relative to the various magnetic field-effect transistors.

In accordance with a further aspect of the invention, a displacement measuring device utilizes a magnetized or electrically charged rotatable or linearly moveable field emitter element coupled to the object whose position is to be measured, and an array of magnetic field or electric field detectors to detect the position of the field emitter element and thus of the object.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1A:
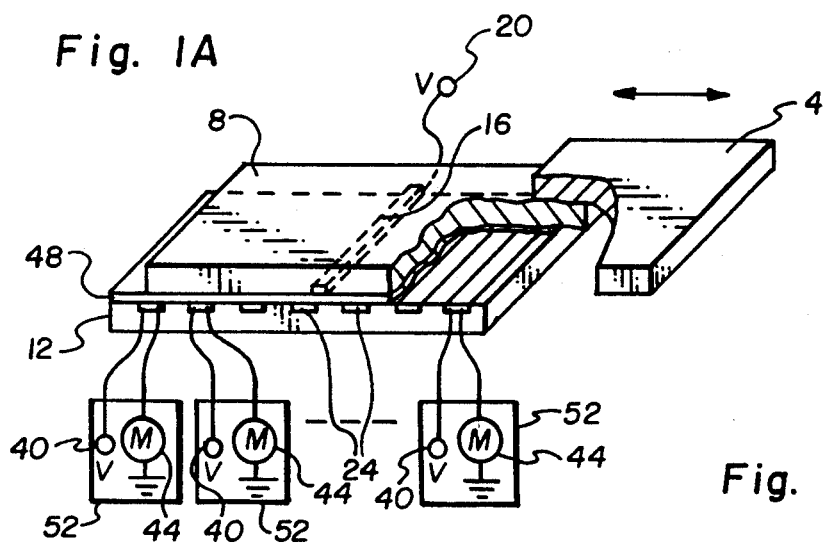
FIGS. 1A, 1B and 1C show respectively a partially cut away, perspective view of displacement measuring apparatus, a field-effect transistor suitable for use in the apparatus of FIG. 1A, and a split-drain, magnetic field-effect transistor also suitable for use in the apparatus of FIG. 1A, all in accordance with the principles of the present invention.

Referring to FIG. 1A, there is shown one illustrative embodiment of a displacement transducer or sensor for measuring one degree of freedom of movement of an object 4. The object 4 (which is simply in the form of a plate) may take any shape or form and could be a part of a robotic system, or other mechanical structure for which the parts position and movement is to be determined. The object 4 is attached to a plate 8 which, in turn, is slidably disposed in contact with the upper, generally planar surface of a substrate 12. Formed to extend transversely in the plate 8 on the underneath side thereof is a strip of conductive material 16 coupled to a voltage source 20 to enable the conductive strip 16 to produce an electric field. The plate 8 might, for example, be made of silicon or sapphire.

The substrate 12 is made, for example of silicon and includes at the upper planar surface thereof the operating parts of a sensor for sensing the position of the plate 8 and thus the position of the object 4. Specifically, there is disposed on and formed, for example, by conventional micro-fabrication techniques on the upper surface of the substrate 12 an array of transversely extending field-effect transistors (FETs)24. The FET is a well known semi-conductor device and includes (FIG. 1B) a conductive source region 28 formed in the substrate 12, a conductive drain region 32 spaced from and formed to be generally parallel with the source region, and a conductive channel region 36 disposed between the source region and drain region. The source region 28 and drain region 32 are maintained at different electrical potentials by a voltage source 40 so electric current is caused to flow between the regions through the channel 36. The conductivity of the channel region 36 is affected by electrical charges (or an electric field) located in close proximity to the channel region. Thus, moving the conductive strip 16 into proximity to the channel region 36 will cause the magnitude of the electric current being directed through the channel region to vary and this will be detected by a meter (ammeter) 44. The disposition of the conductive strip 16 effectively acts as the gate of each of the FETs 24 to control the flow of electric current between the source and drain regions of the FETs.

Disposed on the upper surface of the substrate 12 is a layer of insulation 48 made, for example, of silicon nitride, or silicon dioxide or diamond coating. The layer of insulation 48 serves to both insulate the conductive strip 16 from the FETs 24 and allow for the easy sliding of the plate 8 over the surface of the substrate 12.

Figure 1C:
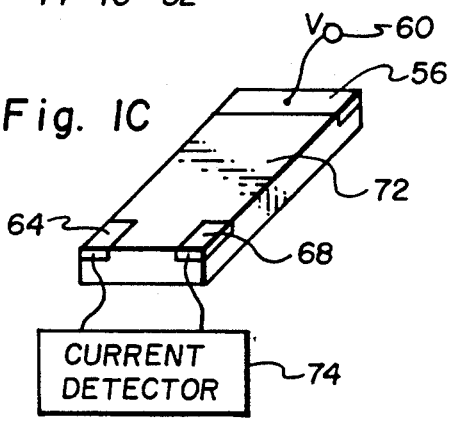
Figure 1B:
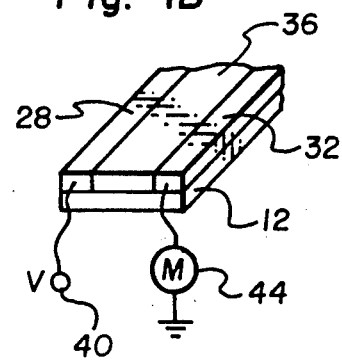

Each of the FETs 24 is connected to a respective signal processing circuit 52 which might illustratively include a voltage source and ammeter as shown in FIG. 1B. By measuring the current flow in the FETs 24, the location of the conductive strip 16 on the substrate 12 can be determined to thereby determine the position and movement of the object 4. A further discussion of the operation of FETs is found in U.S. Pat. No. 4,767,973 issued Aug. 20, 1988, and incorporated herein by reference.

An alternative to utilizing the conductive strip 16 formed in the plate 8 and connected to a voltage source 20 is to provide a strip of material containing positive or negative charges. For example, the strip 16 could illustratively be formed of polytetrafluoroethylene with electrons implanted therein.

An alternative to the FIG. 1A embodiment would be to include layers of conductive material in place of the FETs 24 and then position the FETs remotely from the substrate 12. These conductive layers or gates would be electrically coupled to the gates of corresponding remote FETs so that movement of the conductive strip 16 over the substrate 12 would induce electrical charges on the surfaces of the conductive layers located in the substrate 12 and these electrical charges would be reflected in the gates of corresponding remote FETs to affect the conductivity of the channel regions of those FETs. A measure could then be made of the proximity of the conductive strip 16 to the various conductive layers and thus of the position and movement of the object 4.

Another alternative to the FIG. 1A structure involves positioning a sheet of material, embedded with electrets, between the layer of insulation 48 and the sheet 8, and grounding the conductive strip 16. The electret sheet produces an electric field which normally impinges on each of the FETs 24. When the sheet 8 is moved over the electret sheet so that the conductive strip 16 is moved into proximity with an FET, the conductive strip deflects away at least some of the electric field from the electret sheet normally impinging on that FET. This changes the current flow in that FET so that the location of the conductive strip 16 is determined by which FET produced a current charge signal.

Instead of using FETs 24 in the FIG. 1A structure, split-drain magnetic field-effect transistors (MAGFETs) such as that shown in FIG. 1C, could be employed. In such a case, MAGFETS would be formed on the upper surface of the substrate 12 to include a source region 56 coupled to a DC current source 60, two drain regions 64 and 68, and a conductive channel region 72 disposed between the source region and the two drain regions. The conductive strip 16 would be composed of a strip of magnetizable material to influence the current flow between the two drain regions 64 and 68 of each MAGFET. In the absence of a magnetic field impinging upon the channel region 72, current flows from the source region 56 through the channel region 72 equally to the two drain regions 64 and 68. When a magnetic field is present, such as when the magnetized strip 16 is overlying one of the MAGFETS, the current through the channel region is deflected to flow more to one drain region than the other, with the magnitude of the deflection and thus the imbalance of current flowing to the two drain regions being dependent upon the intensity of the magnetic field. Thus, by measuring the current imbalance in the two drain regions 64 and 68 by, for example a current detector 74, a determination of the location of the magnetized strip 16, and thus of the plate 8 and object 4, can be made.

Although the object 4 is shown coupled to the plate 8 to cause it to move when the object is moved, the object could alternatively be coupled to the substrate 12 to cause it to move relative to a fixed plate. Movement of the object 4 would still be detected.

Figure 2:
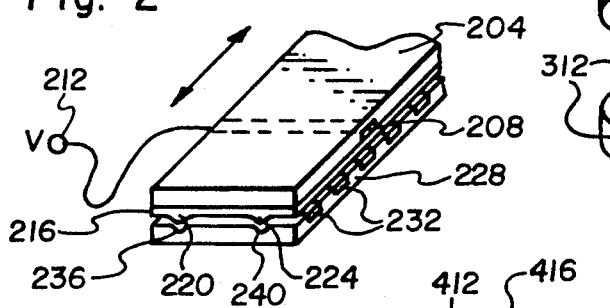
FIG. 2 is a fragmented, end perspective view of displacement measuring apparatus in which an emitter substrate is disposed to slide linearly on rails with respect to a detector substrate.

FIG. 2 shows a perspective, partially fragmented view of another embodiment of a displacement transducer made in accordance with the present invention. In this embodiment, an emitter plate 204 includes a conductive strip of material 208 located transversely in the plate and connected to a voltage source to 212. A layer of insulation 216 is disposed on the underneath side of the plate 204 and is formed with a pair of generally parallel, longitudinally extending rails 220 and 224 which project downwardly from the plate 204. A substrate 228 is disposed under the plate 204 and includes a plurality of sensor elements 232 disposed transversely in the substrate. A pair of generally parallel grooves 236 and 240 are formed in the upper surface of the substrate 228 to slidingly receive the rails 220 and 224 respectively. The rails 220 and 224 are formed to be of sufficient height to maintain the layer of insulation 216 out of contact with the upper surface of the substrate 228 except where the rails are in contact with the grooves 236 and 240. The sliding movement of the plate 204 relative to the substrate 228 is thus facilitated by reducing the contact and thus the friction. Measurement of the position and movement of the plate 204 is carried out in a manner similar to that described for FIG. 1A.

Figure 3A:
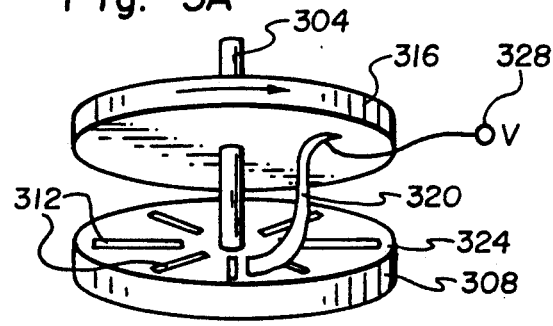
FIG. 3A and 3B show respectively an isometric view of rotational displacement measuring apparatus made in accordance with the present invention, and a side, fragmented, cross-sectional view of the emitter element and detector substrate of the apparatus of FIG. 3A.

FIG. 3A shows an isometric view of apparatus for measuring rotational displacement of a shaft 304. The shaft 304 is mounted to rotate in substrate 308 in which is disposed in an annular or circular configuration an array of sensors 312. A disk 316 is mounted on the shaft 304 above the substrate 308 to rotate as the shaft is rotated. A flexible and resilient electrically conductive foil strip or tab 320 is attached at an upper end to the bottom of the disk 316 so that the lower end thereof contacts and wipes over the upper surface of an insulation layer 324 disposed over the substrate 308 and over the sensors 312. The lower end of the tab 320 moves in a circular path over the array of sensors 312 as the disk 316 and shaft 304 are rotated. A voltage source 328 is coupled to the tab 320 to produce an electric field therein which is sensed by the sensors 312 as the lower end of the tab 320 moves into close proximity with the sensors. The tab 320 might illustratively be comprised of beryllium copper.

Figure 3B:
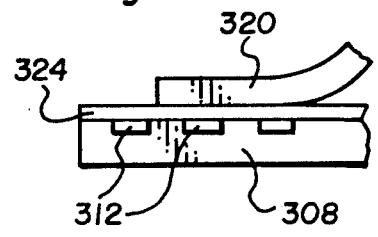

FIG. 3B shows a side, fragmented, cross-sectional view of the lower end of the tab 320 and part of the substrate 308. It will be noted from FIG. 3B that the lower end of the tab 320 would typically overlie two or more of the sensors 312 which would thus produce signals indicating the proximity of the tab. The sensors 312 could either be FETs or MAGFETs as previously discussed.

Figure 4:
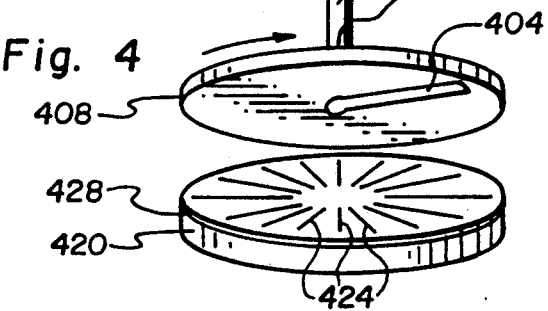
FIG. 4 is an isometric view of another embodiment of rotational displacement measuring apparatus made in accordance with the present invention.

FIG. 4 is an isometric view of another embodiment of rotational displacement measuring apparatus in which the foil tab 320 of FIG. 3A is replaced by a conductive strip 404, formed to extend radially on the underneath side of a disk 408 which is mounted on a shaft 412. A voltage source 416 supplies a voltage to the conductive strip 404 to allow it to produce an electric field. A substrate 420 includes an array of sensors 424 arranged generally in a circle on the upper surface of the substrate. An insulation layer 428 overlays the substrate 420 and the sensors 424.

The disk 408 would be placed directly on the insulation 428 and would be rotated to slidingly contact the insulation layer, unlike the embodiment of FIG. 3A. Of course, the angular position of the conductive strip 404 and thus of the disk 408 and shaft 412 can readily be determined by which of the sensors 424 detects the presence of the conductive strip, as previously described.

Figure 5:
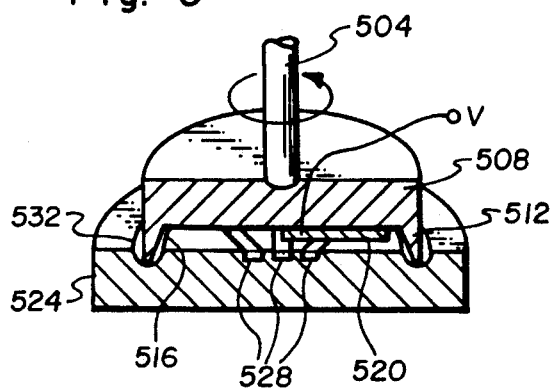
FIG. 5 is a side, cross-sectional view of still another embodiment of rotational displacement measuring apparatus made in accordance with the present invention.

FIG. 5 shows a side, cross-sectional view of rotational displacement measuring apparatus, where the rotational displacement to be measured is of a shaft 504. The shaft 504 is coupled to a disk carrying member 508 having a downwardly projecting perimeter lip 512 which defines a recess 516 on the under side of the disk. Disposed in this recess is a conductive emitter strip 520, similar to the conductive strip 404 of FIG. 4. A substrate 524 is disposed under the disk 508 and includes an array of radially positioned sensors 528, again similar to the sensors of the FIG. 3A and 4 embodiments. Also formed in the upper surface of the substrate 524 is a circular groove 532 for slidingly receiving the lip 512 of the disk 508. The groove 532, of course, acts as a guide for rotational movement of the disk 508. The lip 512 of the disk is of sufficient height to maintain the emitter strip 520 out of contact with the top surface of the substrate 524 so that a layer of insulation is not needed on the substrate.

In the FIGS. 2 and 5 embodiments, protuberances (rails 220 and 224 in FIG. 2 and lip 512 in FIG. 5) serve to maintain part of the moveable plate or disk out of contact with the corresponding substrate. Of course, various shaped and positioned protuberances could be provided. For example, the spacing of an upper moveable disk or plate and a lower substrate could be maintained with three spaced-apart nipples extending downwardly from the upper plate or disk to contact the substrate. Also, using only three such nipples would tend to minimize the contact and thus the friction between the moveable plate or disk and the substrate, and to maintain stable, three-point contact between the plate or disk and substrate.

Figure 6:
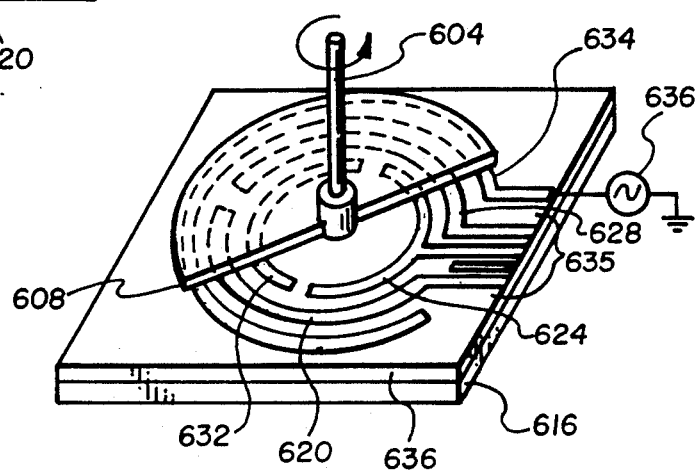
FIG. 6 shows a perspective view of an embodiment of rotational displacement measuring apparatus utilizing a hemi-disk emitter.

FIG. 6 is a perspective view of another embodiment of apparatus for measuring angular or rotational displacement of a shaft 604. Mounted to rotate with the shaft 604 is a semicircular conductive plate 608. A substrate 616 is positioned under the plate 608 and includes, in the upper surface thereof, four FET sensors 620, 624, 628 and 632, and a conductive strip of material 634. Each of the FET sensors is formed in a semicircle (with parallel extending source, drain and channel regions) to be concentric with at least a portion of two of the other sensors, and the strip of material 634 is formed concentrically about the sensors. Thus, sensor 620 circumscribes a portion of sensor 624 and a portion of sensor 632, while sensor 628 circumscribes the other parts of sensors 624 and 632. Each of the sensors is connected to a respective edge connector 635 and then to appropriate sensing circuitry as earlier described. The conductive strip 634 is coupled to an A.C. electrical voltage source 636. Disposed on the substrate 16 over the sensors 620, 624, 628 and 632 and over the conductive strip 634 is a layer of dielectric/insulation 636. The plate 608 is mounted to contact and slide over the surface of the layer 636 so that it will always cover portions of at least three of the FET sensors as well as about one-half of the conductive strip 634.

The signal supplied by the voltage source 636 to the conductive strip 634 develops a capacitance between the conductive strip and the plate 608 and this capacitance, of course, results in the development of a charge on the plate and an electric field emanating from the plate. In this manner, an A.C. electric field is developed on the plate 608 by capacitive coupling with the A.C. voltage source 636.

In operation, the FET sensors 620, 624, 628 and 616 produce signals indicative of the proportion of the sensor effected by the electric field produced by the plate 608 and thus by the portion of the sensor which is covered by the plate. The signals, in turn, define the angular position of the shaft 604 and thus the angular position of any object to which the shaft is connected.

Figure 7:
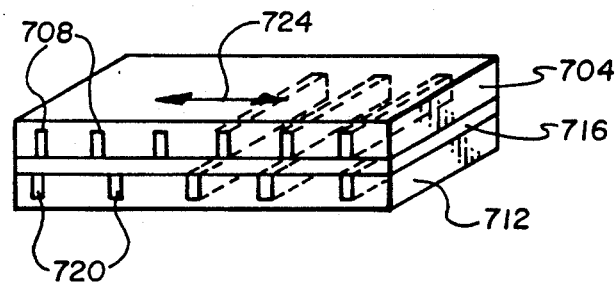
FIG. 7 is a side, cross-sectional view of linear displacement measuring apparatus utilizing a Vernier principle of measurement.

FIG. 7 is a perspective, cross-sectional view of a Vernier-type displacement measuring apparatus which includes an upper moveable plate 704 in which a plurality of force field emitters 708 are disposed in a spaced-apart array along the lower surface of the plate. The emitters could be electrically conductive strips positioned transversely of the plate 704 as shown by the dotted lines, or similarly transversely positioned magnetized strips. The plate 704 is disposed over a substrate 712 on which is formed an insulation layer 716. Formed in the substrate 716 at the upper surface thereof are a plurality of transversely extending, spaced-apart detector elements 720. These detector elements could illustratively be FETs or MAGFETs. As can be seen, the end-most force field emitters of the array 708 are positioned opposite respective end-most force field detector elements 720, when the plate 704 is in the null position. This configuration of force field emitters 708 relative to the force field detector elements 720 is similar to a Vernier scale arrangement. This allows for detection even a small movement of the plate 704 relative to the substrate 712. In particular, with a small movement of the plate 704 in the direction indicated by the arrows 724, the end-most force field emitters become misaligned with the end-most force field detector elements and either the second from the end force field emitters come into alignment with the second from the end force field detector elements, depending on which direction the plate is moved. The force field detector elements 720 detect the close proximity of aligned force field emitters 708 to provide a readout indicating the magnitude of movement of the plate 704 and thus the magnitude of movement of an object to which the plate is connected.

Figure 8:
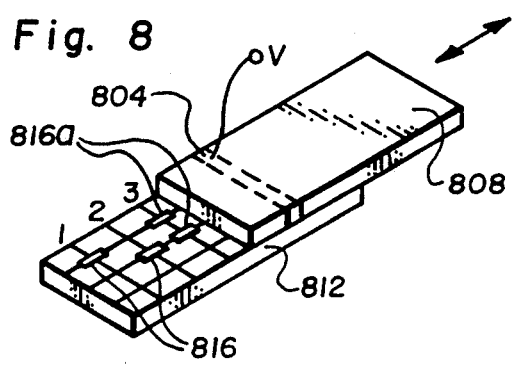
FIG. 8 is a perspective view of displacement measuring apparatus for producing a digital output representing the position and movement of an object, in accordance with the present invention.

FIG. 8 is a perspective view of displacement measuring apparatus for producing a digital output signal representing position of a conductive strip of material 804 disposed transversely on the underside of a moveable plate 808, and thus of an object to which the plate might be attached. A substrate 812 includes a plurality of sensors 816 positioned at selected intersections of an imaginary grid on the surface of the substrate so that as the plate 808 is moved over the substrate, different combinations of sensors are affected by an electric field produced by the conductive strip 804, and these combinations produce binary coded output signals. For example, if sensors 816a were overlayed by the conductive strip 804, then those sensors would produce signals which would represent the numeral 3. In this fashion, digital output signals are produced to represent different positions of the conductive strip 804 over the substrate 812 and thus different positions of an object coupled to the plate 808.

Figure 9:
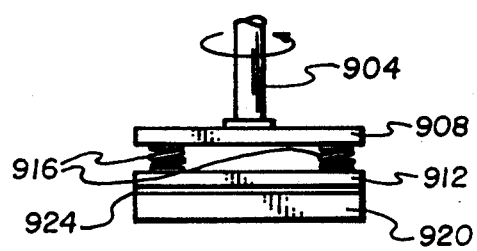
FIG. 9 is a side, elevational view of rotational displacement measuring apparatus having a spring suspension mount for the emitter disk.

FIG. 9 is a side view of a rotary displacement transducer for measuring the angular displacement of a shaft 904. The shaft 904 is coupled at its lower end to a mounting disc 908 on which an emitter disc 912 is mounted by at least three springs 916 (two of which are shown) so that the plate 912 is located below the mounting plate 908 to rotate when the shaft 904 is rotated. The springs 916 might illustratively be made of beryllium copper. The plate 912 rests lightly on a detector substrate 920 whose upper surface is coated with a insulation layer 924. The apparatus of FIG. 9 would operate in a fashion similar to that shown in FIG. 4, with the spring mounting of the emitter plate 912 providing a light pressure to maintain stability of rotation of the plate 912 over the surface of the substrate 920.

Figure 10:
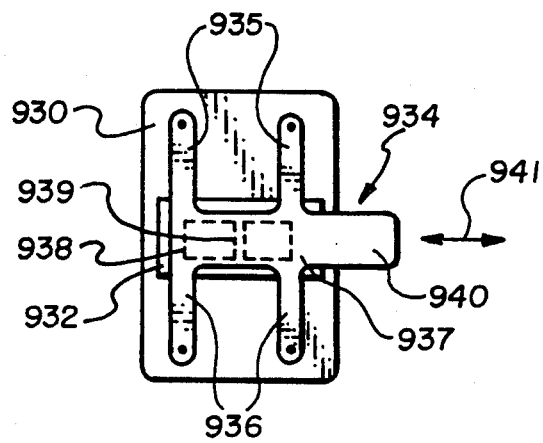
FIG. 10 is a top plan view of another embodiment of a linear displacement transducer made in accordance with the present inventor.

FIG. 10 is a top plan view of another embodiment of displacement measuring apparatus which includes a mounting plate 930 on which is disposed a detector substrate 932 having an array of transversely positioned sensors as previously described. Positioned over the substrate 32 is an emitter support structure 934. This support structure includes an H-shaped section having two pair of legs 935 and 936 extending in opposite directions from a central section 937 on the underside of which is disposed an emitter plate 938 (shown by dotted line) having a conductive strip 939 (also shown by dotted line). Extending transversely of the legs 935 and 936 is a tab 940 to which an object whose position and movement were to be measured could be coupled. The legs 935 and 936 are attached at their free ends to the mounting plate 930 but are sufficiently flexible and resilient to allow movement of the central section 937 in the direction indicated by the arrow 941. Such movement may be detected by the detector substrate 932 as previously described. Advantageously, the emitter support structure 934 is made of a thin beryllium copper material to provide the flexibility desired.

Figure 11:
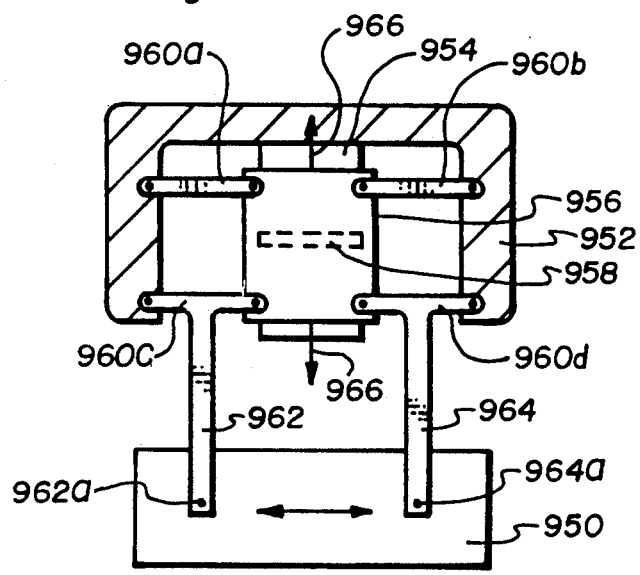
FIG. 11 is a top plan view of a linear displacement transducer adapted for measuring strain in an object.

FIG. 11 is a top plan view of a linear displacement transducer adapted for measuring strain in an object 950 to which the transducer is attached. The transducer includes an inverted U-shaped base 952 to which a detector substrate 954 is mounted. Disposed above the substrate 954 to slide thereover is an emitter plate 956 having a conductive strip of material 958 formed on the underneath side thereof as earlier described. Four legs 960a, 960b, 960c and 960d are pivotally connected at one end to the emitter plate 956 and at the other end to mounting base 952 as shown. Long connecting legs 962 and 964 extend laterally from legs 960c and 960d respectively and are pivotally attached at their free ends 962a and 964a to the object 950 in which strain is to be measured. The legs 960a, 960b, 960c, 960d, 962 and 964 are substantially nonflexible in the lateral direction.

When the object 950 is subject to strain, either pulling apart or squeezing together, the ends 962a and 964a of legs 962 and 964 are caused to be moved apart or moved toward one another and such movement, in turn, causes the emitter plate 956 to be moved upwardly or downwardly as indicated by the arrows 966. That is, if the ends of the legs 962 and 964 are moved toward one another, the ends of legs 960c and 960d which are attached to the emitter plate 956 are caused to pivot upwardly to thereby move the emitter plate upwardly. Conversely, if the ends 962a and 964a of the legs 962 and 964 respectively are moved apart, the emitter plate 956 is caused to move downwardly. Of course, movement of the emitter plate 956 relative to the detector substrate 954 may be measured, as previously described, to provide a measure of the strain in the object 950.

Figure 12:
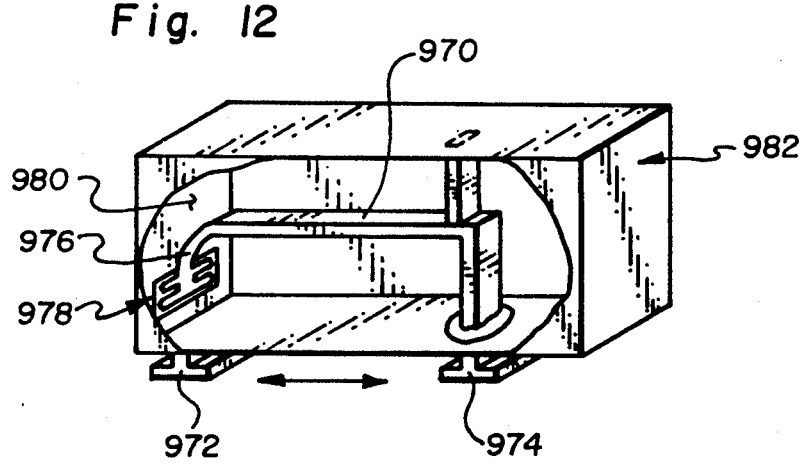
FIG. 12 is a perspective view of a uniaxial strain transducer which utilizes the device of FIG. 10.

FIG. 12 is a partially cut-away, perspective view of a uniaxial strain measuring transducer which employs the linear displacement transducer of FIG. 10. The construction and operation of the strain transducer of FIG. 12 is described in the aforecited co-pending application, Ser. No. 424,406, and is incorporated herein by reference. Briefly, a pivot arm 970 is caused to pivot when feet 972 and 974 (which are attached to the object in which strain is to be measured) are caused to move toward or away from one another. The end of pivot arm 970 is coupled to a projection 976 corresponding to the tab 940 of the FIG. 10 structure. The FIG. 10 structure is shown at 978 attached to an end wall 980 of a housing 982 in which the component parts of the transducer are contained. Pivoting upwardly or downwardly of the pivot arm 970 causes movement of the emitter plate of the transducer 978 and this can be measured to thereby provide a measure of movement of the pivot arm 970 and thus of the feet 972 and 974. In this manner, strain in an object to which the feet 972 and 974 are attached can be measured.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Displacement measuring apparatus comprising
   an object whose displacement is to be measured,
   sensor means formed with at least one surface area and including means for producing an electrical output signal, the value of the electrical output signal varying with variations in proximity of a field-producing element to said surface area,
   a carrying member, including the field-producing element, disposed in contact with said surface area to slide thereover when the object is moved to thereby change the proximity of the field-producing element to the surface area and thus vary the value of the output signal of said sensor means, and
   insulative means interposed between the sensor means and the carrying member, the insulative means being substantially electrically insulative and positioned to allow slidable contact between the insulative means and at least one of the sensor means and the carrying member such that the distance between the sensor means and the carrying member remains substantially constant as sliding movement therebetween occurs causing the value of the output signal to vary.

2. Apparatus as in claim 1 wherein said insulative means comprises an insulative coating disposed over said one surface area.

3. Apparatus as in claim 2 wherein said sensor means comprises
   a substrate having a first surface area, said carrying member being in slidable contact with said first surface area, and
   an array of detecting means disposed at the first surface for detecting the proximity of the field-producing element relative to the detecting means and thus the displacement of said object.

4. Apparatus as in claim 3 wherein said sensor means further comprises means for supplying a voltage to said field-producing element to produce an electric field emanating therefrom, and wherein said detecting means each comprises a field-effect transistor having a source region, a drain region, a channel region positioned between the source region and drain region on the first surface under the path of movement of the field-producing element, said insulative means overlying the source region, drain region and channel region, said field-effect transistor thereby producing the output signal when the field-producing element is moved to within a certain proximity of said field-effect transistor.

5. Apparatus as in claim 4 wherein said substrate is composed of silicon, wherein said insulation coating is composed of material selected from a group consisting of silicon nitride, silicon dioxide, and diamond film.

6. Apparatus as in claim 3 wherein said field-producing element is magnetized, and wherein said detecting means each further comprises a split-drain magnetic field-effect transistor having a source region, two drain regions, and a channel region positioned between the source region and two drain regions at the first surface under path of movement of the field-producing element, said split-drain magnetic field-effect transistor thereby producing an output signal when the field-producing element is moved to within a certain proximity of said magnetic field-effect transistor.

7. Apparatus as in claim 6 wherein said substrate is composed of silicon, and wherein said conductive element is composed of magnetized material.

8. Apparatus as in claim 3 wherein said sensor means further comprises an array of conductive strips of material disposed on the first surface and extending under the path of movement of the field-producing element, said insulative means overlying the array of conductive strips, and means for supplying an electrical voltage to said field-producing element, and wherein said detecting means each comprises a field-effect transistor having a gate region coupled to a corresponding conductive strip so that the field-effect transistor produces an output signal when the field-producing element is positioned within a certain proximity of the conductive strip.

9. Apparatus as in claim 3 wherein said sensor means further comprises electret means for producing an electric field said electret means being disposed on the first surface to extend under the path of movement of the field-producing element, wherein said field-producing element is grounded, and wherein said detecting means each comprises a field-effect transistor having a source region, a drain region, and a channel region positioned between the source region and drain region under the electret means, said field-effect transducer thereby producing an output signal when the field-producing element is positioned within a certain proximity of the field-effect transistor to deflect away from the channel region of the field-effect transistor the electric field normally impinging thereon from the electret means.

10. Apparatus as in claim 9 wherein said electret means comprises a strip of polytetrafluoroethylene containing electrons and disposed over at least the channel region of each field-effect transistor and under the path of movement of the field-producing element.

11. Apparatus as in claim 3 wherein said array of detecting means is disposed generally in a line on the first surface in the direction of movement of the field-producing element, each of said detecting means including means for producing a signal indicative of the field-producing element being within a certain proximity of said each detecting means.

12. Position determining apparatus comprising
an article whose position is to be determined,
a force field developing means disposed to selectively move over a surface loci of points as the article is moved,
sensor means defining a surface area coincident with said loci of points; and
insulative means interposed between the force field developing means and the sensor means, the insulative means being substantially electrically insulative and positioned to allow slidable contact between the force field developing means and the sensor means such that the distance between the sensor means and the carrying member remains substantially constant as sliding movement therebetween occurs such that when said force field developing means moves in sliding contact with said surface area a plurality of signals are produced whose magnitudes are proportional to the proximity of the force field developing means to respective points of said loci of points, and thus indicative of the position of the article.

13. A displacement transducer for converting the position of an object into an electrical signal representation comprising
a sensor having a surface area defined thereon for developing an electrical signal whose value is dependent upon a location over the surface area of an emitter element having a certain electrical/magnetic characteristic,
an insulation layer overlying the surface area, and
an emitter element having said certain electrical/magnetic characteristics, and disposed in contact with said insulation layer to slide thereover as the object is moved and such that the distance between the sensor and the emitter element remains substantially constant as the sliding movement occurs and the value of the electrical signal varies as the location over the surface area of the emitter element is varied.

* * * * *